United States Patent [19]
Nguyen

[11] Patent Number: 5,907,803
[45] Date of Patent: May 25, 1999

[54] USER ASSISTED FRAUD DETECTION IN A CELLULAR COMMUNICATIONS SYSTEM

[75] Inventor: Viet Nguyen, Montreal, Canada

[73] Assignee: Telefonaktiebolaget L M Ericsson (publ), Stockholm, Sweden

[21] Appl. No.: 08/784,121

[22] Filed: Jan. 14, 1997

[51] Int. Cl.[6] .................................................. H04Q 7/22
[52] U.S. Cl. ........................................ 455/410; 455/406
[58] Field of Search .................................. 455/410, 411, 455/408, 405, 406, 407, 409, FOR 100; 329/114, 115, 116, 119

[56] References Cited

U.S. PATENT DOCUMENTS

| | | | |
|---|---|---|---|
| 4,955,049 | 9/1990 | Ghisler | 379/58 |
| 5,291,543 | 3/1994 | Freese et al. | 455/408 |
| 5,309,501 | 5/1994 | Kozik et al. | 379/58 |
| 5,506,893 | 4/1996 | Buscher et al. | 379/114 |
| 5,517,549 | 5/1996 | Lee | 379/52 |
| 5,577,100 | 11/1996 | McGregor et al. | 455/406 |
| 5,577,103 | 11/1996 | Foti . | |
| 5,619,552 | 4/1997 | Karppanen et al. | 455/433 |
| 5,673,306 | 9/1997 | Amadon et al. | 379/88.01 |
| 5,692,037 | 11/1997 | Friend | 379/114 |
| 5,732,127 | 3/1998 | Hayes | 379/115 |
| 5,732,128 | 3/1998 | Bushnell | 379/119 |
| 5,758,279 | 5/1998 | Foti | 455/412 |

FOREIGN PATENT DOCUMENTS

| | | |
|---|---|---|
| 0656733 | 11/1995 | European Pat. Off. . |
| WO 95/29554 | 6/1995 | WIPO . |

OTHER PUBLICATIONS

PCT Search Report dated Oct. 12, 1998 for PCT/SE 97/02204.

*Primary Examiner*—Reinhard J. Eisenzopf
*Assistant Examiner*—Charles N. Appiah
*Attorney, Agent, or Firm*—Jenkens & Gilchrist

[57] ABSTRACT

Information relating to previously made or received calls charged to a subscription associated with a given mobile station is stored in a data base. The information stored comprises called/calling party identification, time of day for the call, and duration of the call in relation to all long distance calls (incoming and outgoing) that are charged to the mobile station subscription. This information is then delivered at certain predetermined times to the subscriber via the mobile station. Responsive to receipt of the information, the subscriber may compare the cellular service record of prior subscription use to their own recollection of use. If the record and the recollection do not coincide, it is possible that a fraudulent use of the subscription via a cloned (or otherwise fraudulent) mobile station has occurred. A prompt report of the fraudulent use may then be made to the cellular service provider.

20 Claims, 3 Drawing Sheets

USER ASSISTED FRAUD DETECTION IN A CELLULAR COMMUNICATIONS SYSTEM

BACKGROUND OF THE INVENTION

1. Technical Field of the Invention

The present invention relates to cellular communications systems and, in particular, to the detection of fraudulent mobile station use within a cellular communications system.

2. Description of Related Art

In existing cellular telephone networks, fraudulent users may attempt to place long distance telephone calls by causing the network to recognize the calls as being placed by a legitimate subscriber. This goal is accomplished by cloning the mobile station of a subscriber, including its electronic serial number (ESN) and mobile identification number (MIN). The cloned mobile station then appears to the network to be the subscriber's legitimate mobile station, thereby allowing the fraudulent user to freely place calls, and in particular place long distance telephone calls, and charge those calls to the subscription for the real mobile station. In most cases, the subscriber is not aware of the fraudulent use until after receiving an invoice from the cellular service provider for calling services. It is only then that the fraudulent use of a cellular subscription is detected. By that time, however, thousands of dollars of unrecoverable calling charges for long distance calls have been incurred, and the fraudulent user has often moved on to the cloning and fraudulent use of another mobile station.

There is a need then for a mechanism that allows for a more prompt detection of fraudulent use of a cellular communications system subscription.

SUMMARY OF THE INVENTION

The present invention addresses the foregoing problem by storing, in a data base associated with the cellular communications system, information relating to previously made or received calls charged to served mobile station subscriptions. The information stored for each such call comprises: called/calling party identification; time of day for the call; and, duration of the call. Typically, this information is stored for all long distance calls (incoming and outgoing) that are charged to the mobile station subscription. This information is downloaded to a switching node serving the mobile station, and delivered to the subscriber at certain predetermined times. The delivery of the information may be made by way of an oral communication handled through the mobile station, or through a data message transmitted for display by the mobile station. Responsive to receipt of the information, the subscriber may compare the cellular service record of calls associated with their cellular subscription to their own recollection of calls made and received. If the calling record and the recollection do not coincide, it is possible that a fraudulent use of the subscription via a cloned (or otherwise fraudulent) mobile station has occurred. A prompt report of the fraudulent use may then be made to the cellular service provider.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
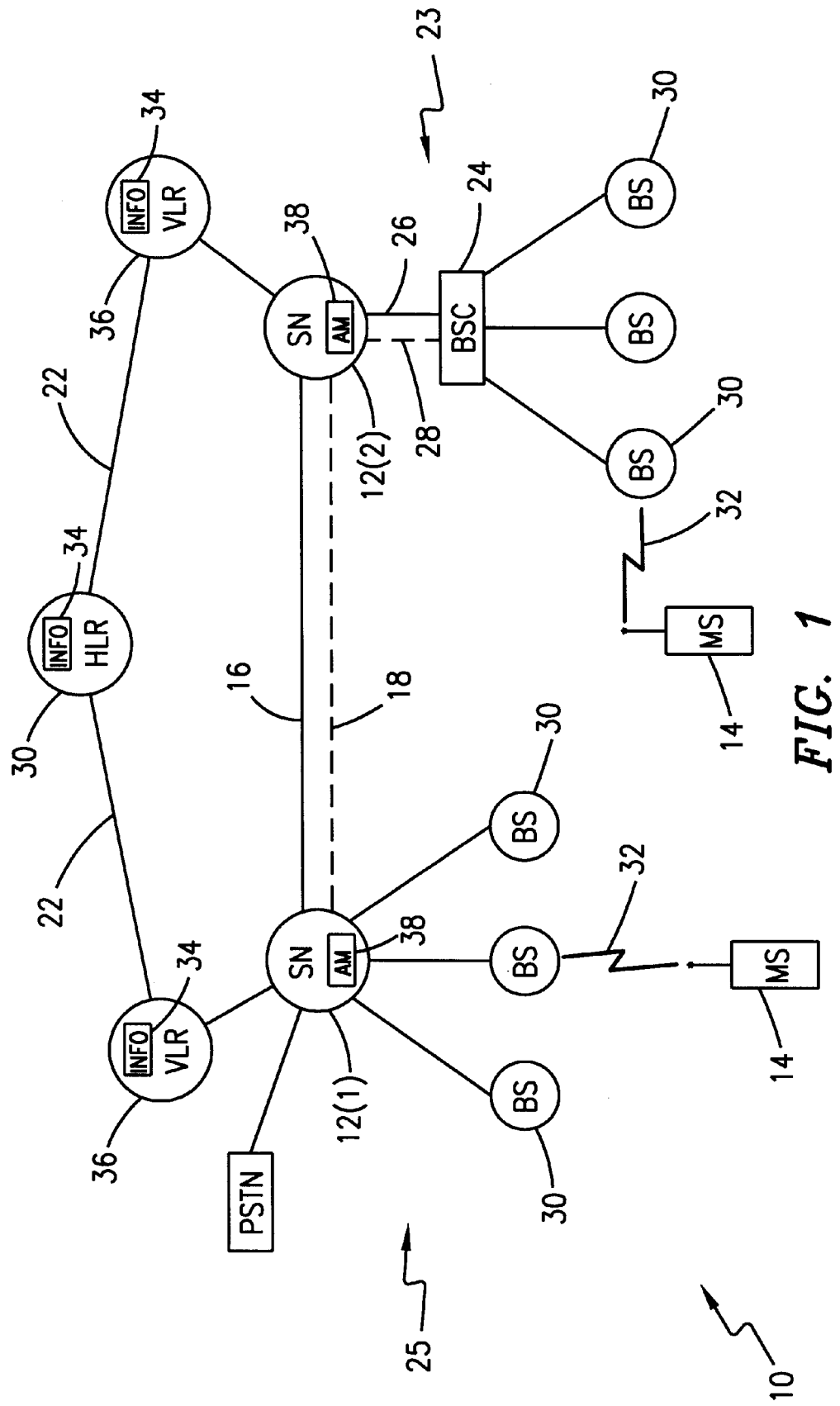
FIG. 1 is a schematic diagram of a cellular telephone network of the present invention.

Reference is now made to FIG. 1 wherein there is shown a schematic diagram of a cellular telephone network 10 including a plurality of interconnected switching nodes (SN) 12. Although only two switching nodes 12 are shown, it will be understood that the network 10 likely includes many more interconnected nodes. The first and second switching nodes 12(1) and 12(2) may comprise any one of a number of known telecommunications switching devices, including those commonly used and known in the art for providing either digital or analog cellular telephone service to a plurality of mobile stations (MS) 14. The switching nodes 12 are interconnected with each other for communication via both voice trunks 18 (illustrated with broken lines) and signaling links 16 (illustrated with solid lines) providing a known ISUP (or R1 or R2) type connection. The voice trunks 18 provide voice and data communications paths used to carry subscriber communications between the switching nodes 12. The signaling links 16 carry command signals between the switching nodes 12. These signals may be used, for example, in setting up and tearing down voice and data communications links over the voice trunks 18 and controlling the provision of calling services to the mobile stations 14.

The switching nodes 12 are also connected to a home location register (HLR) 20 through their associated visitor location register (VLR) 36 by means of signaling links 22 providing a known Mobile Application Part (MAP) or IS-41 type connection. The home location register 20 stores information relating to the mobile stations 14 and their subscriptions comprising location information and service information. In connection with the present invention, as will be described in more detail below, the home location register 20 further stores information relating to previously made or received calls charged to the subscription associated with each served mobile station 14.

In one cellular system implementation, illustrated generally at 23, the switching node 12 is further connected to at least one associated base station controller (BSC) 24 via both a signaling link 26 and a voice trunk 28. Only one base station controller 24 is shown connected to switching node 12(2) in order to simplify the illustration. The voice trunk 28 provides a voice and data communications path used to carry subscriber communications between the second switching node 12(2) and its base station controller 24. The signaling link 26 carries command signals between the node 12 and its associated base station controller 24. The signaling link 26 and trunk 28 are collectively commonly referred to in the art as the "A interface". The base station controller 24 is then connected to a plurality of base stations (BS) 30 which operate to effectuate radio frequency communications with proximately located mobile stations 14 over an air interface 32. The base station controller 24 functions in a well known manner to control this radio frequency communications operation.

In another cellular system implementation, illustrated generally at 25, the switching node 12(1) is further connected to a plurality of base stations (BS) 30 which operate to effectuate radio frequency communications with proximately located mobile stations 14 over the air interface 32. In this implementation, the functionality provided by the base station controller 24 (see, generally at 23) is instead provided by the switching node 12.

Although direct communications links (signaling and/or trunk) are illustrated in FIG. 1, it is understood by those skilled in the art that the links are not necessarily direct between the illustrated nodes, and may instead pass through many other communications nodes (not shown) of the mobile network, and perhaps even utilize other communications networks (such as the public switched telephone network—PSTN). Illustration of the links in the manner shown in FIG. 1 is therefore by way of simplification of the drawing.

For each cellular service subscription associated with a served mobile station 14, the home location register 20 stores information 34 relating to previously made or received calls charged to that subscription. The information 34 stored comprises: called/calling party identification; time of day for the call; and, duration of the call. Because storage space within the home location register 20 is a limited quantity, the information 34 is preferably stored only for long distance calls charged to that subscription, and further only with respect to the last n of those long distance calls. However, if space is available, all calls may be logged. Once information 34 for n long distance calls has been logged, information relating to a subsequent long distance call is stored with the information relating to the oldest logged long distance call being deleted. The home location register 20 accordingly implements a first in, first out (FIFO) type queuing of the stored information 34.

When a mobile station 14 makes an initial registration with the system through a particular switching node 12, that switching node requests a subscriber profile relating to that mobile station, and its corresponding subscription, from the home location register 20. In addition to the conventional subscriber profile information downloaded from the home location register 20 for storage in a visitor location register (VLR) 36 associated with the switching node 12, the home location register further sends the stored information 34 relating to previously made or received calls charged to the subscription associated with that mobile station 14. Responsive thereto, the switching node communicates all or part of the received information 34 to the subscriber. The communication may be made by way of placing a call to the mobile station 14 and using an announcement machine (AM) 38 to orally communicate the information 34 over the call connection. Alternatively, the communication may be made by way of sending a data message, such as a short message service (SMS) message or unstructured supplementary service data (USSD) message, over the air interface 32 for display of the information 34 by the mobile station 14.

In response to the communication of the information 34 relating to previously made or received calls, the subscriber may monitor the use of their subscription for fraud. As the communicated information 34 identifies n prior incoming or outgoing long distance calls charged to the subscription associated with that mobile station 14, the subscriber is informed of prior subscription use and may compare the cellular service record of that use to their own recollection of use. If the record and the recollection do not coincide, it is possible that a fraudulent use of the subscription via a cloned (or otherwise fraudulent) mobile station has occurred. The subscriber may then provide to the cellular service provider a prompt report of called/calling party identification, call time of day, and call duration for purposes of tracking the fraudulent user and correcting the billing errors relating to the fraudulent use.

The information 34 may further be communicated to the subscriber during or following any incoming or outgoing call made to or from the mobile station 14. Alternatively, the information may be communicated to the subscriber with each instance of a new entry being made and stored in the home location register 20. In this regard, the modification of the stored information 34 causes an automatic download of the revised information to the switching node 12 for storage in the visitor location register 36. Still further, the subscriber may selectively choose the circumstances under which the information 34 is communicated to the mobile station 14. For example, the subscriber may only want to know the information 34 upon each initial registration with the system.

Figure 2:
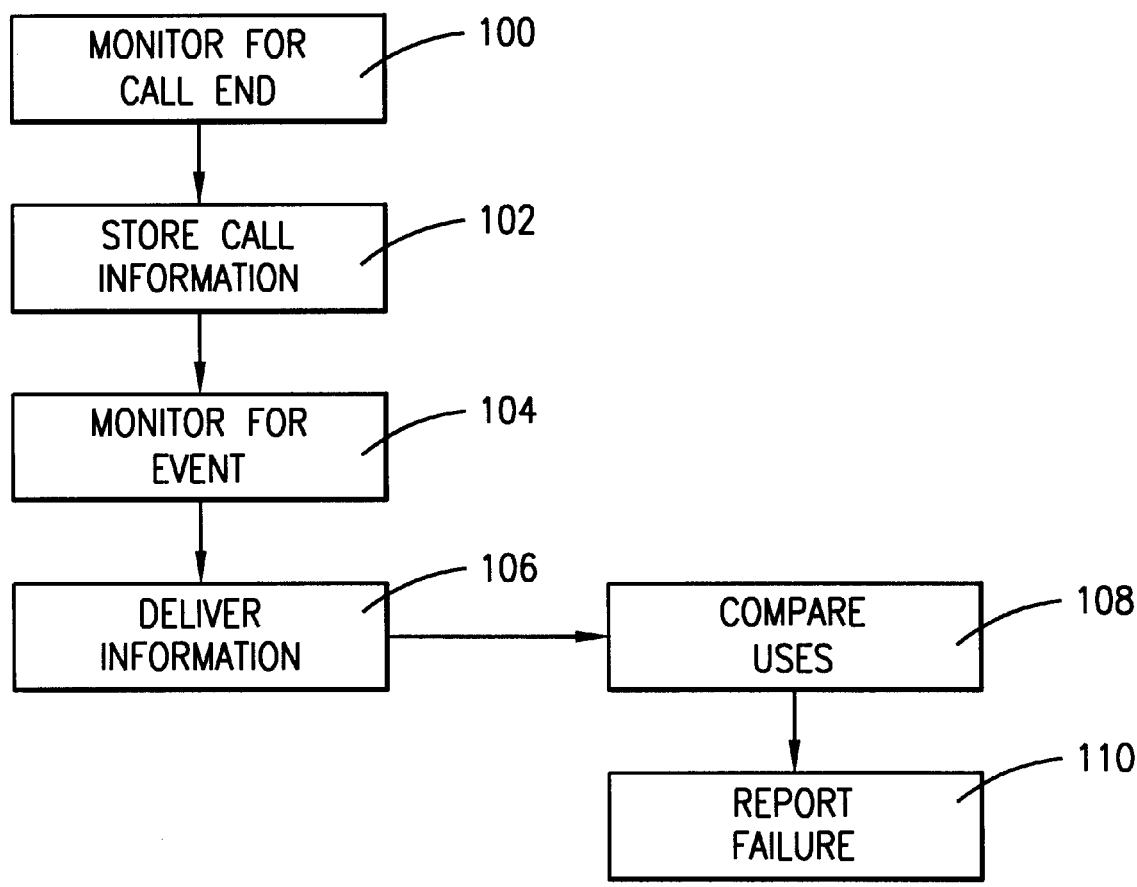
FIG. 2 is a flow diagram illustrating operation of the cellular network of FIG. 1 in accordance with the present invention.

Reference is now made to FIG. 2 wherein there is shown a flow diagram illustrating operation of the cellular network of FIG. 1 in accordance with the present invention. In step 100, the cellular communications system monitors for the end of a call. Responsive thereto, the system stores (in step 102) information relating to that call in association with the subscription (and subscriber profile) to which the call is charged. The information stored comprises: called/calling party identification; time of day for the call; and, duration of the call. Typically, this information is stored for all long distance calls (incoming and outgoing) that are charged to a mobile station subscription. The system then monitors (step 104) for a predetermined subscriber-related event. Such a subscriber-related event may comprise a registration of the mobile station with the system, or the initiation of an outgoing call from the mobile station. Still further, the subscriber-related event may comprise an instance of the updating of the stored information with respect to a recently made call. Responsive to the detected event, the system delivers the stored information (relating to previously made or received calls charged to the subscription associated with the mobile station) to the subscriber via the subscriber mobile station (step 106). Responsive to receipt of the information, the subscriber may compare (step 108) the cellular service record of prior mobile station use to their own recollection of use. If the record and the recollection do not coincide (i.e., certain ones of the logged calls are identified by the subscriber as not being originated by or terminated to the subscriber), it is possible that a fraudulent use of the subscription via a cloned (or otherwise fraudulent) mobile station has occurred. A prompt report (step 110) of the fraudulent use may then be made to the cellular service provider. It will, of course, be understood that the step 108 of comparing may alternatively be instigated by the cellular service provider in instances where a suspicion of fraud exists.

Figure 3:
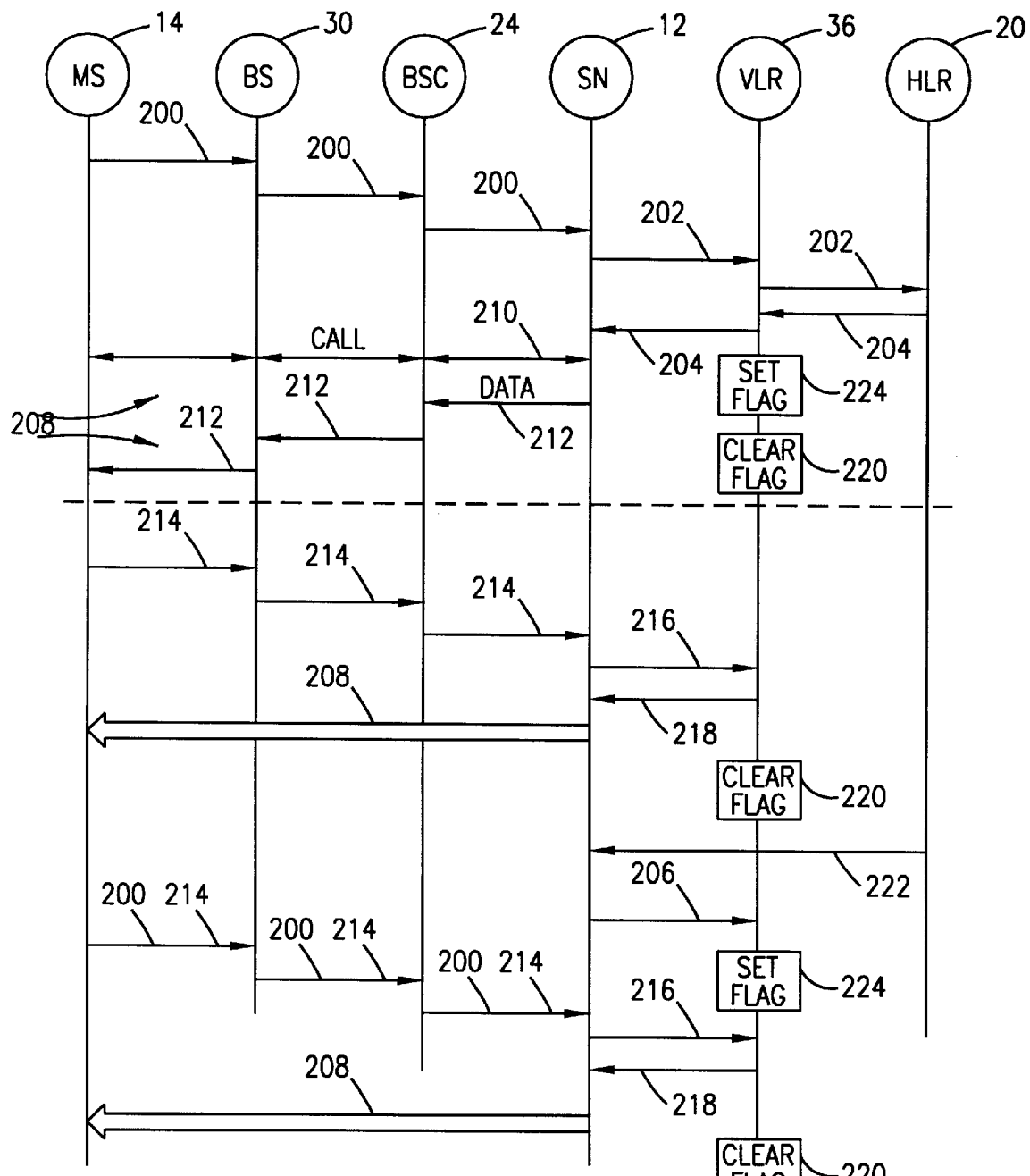
FIG. 3 is a signal flow and node operation diagram illustrating operation of the cellular network of FIG. 1 in accordance with the present invention.

Reference is now made to FIG. 3 wherein there is shown a signal flow and node operation diagram illustrating operation of the cellular network of FIG. 1 in accordance with the present invention. A mobile station 14 makes a registration with the cellular communications system by transmitting a registration message 200 to the serving switching node 12 through the serving base station 30 (and perhaps the serving base station controller 24). Responsive thereto, the switching node 12 sends a registration notification message 202 to the home location register 20 through the visitor location register 36 requesting the subscriber profile associated with the registering mobile station 14. The home location register retrieves the subscriber profile, as well as the stored information 34 relating to previously made or received calls charged to the subscription associated with that mobile station, and sends that information back to the requesting switching node 12 in message 204. The information 34 is then communicated 208 to the subscriber. The communication 208 may be made by way of placing a call 210 to the mobile station 14 and using an announcement machine 38 to orally communicate the information 34 over the call connection. Alternatively, the communication 208 may be made by way of sending a data message 212, such as a short message service (SMS) message or unstructured supplementary service data (USSD) message, over the air interface 32 for display of the information 34 by the mobile station 14.

Responsive to a subsequent call origination 214 from the mobile station 14, the switching node 12 retrieves (signals 216 and 218) the information 34 from the visitor location register 36 and communicates 208 that information to the subscriber via the mobile station. In one embodiment of the present invention, an indicator flag (F) is maintained in association with the information 34 stored in the visitor location register 36. This flag is cleared (action 220) following a successful communication 208 of the information 34 to the subscriber. If a subsequent call origination 214 by the mobile station 14 is received by the switching node and the indicator flag remains cleared, no responsive communication of the information to the mobile station is made. If, however, the switching node is provided 222 with updated information 34 for storage 206 in the visitor location register 36, the indicator flag is set (action 224). Responsive to a subsequent registration 200 or call origination 214, the switching node retrieves (216 and 218) the information 34, communicates 208 the information to the mobile station, and then clears the indicator flag (action 220).

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for providing a subscriber with information concerning the use of his cellular subscription, comprising the steps of:

storing in a home/visitor location register which also stores the subscriber's cellular subscription information relating to a plurality of previously made or received calls charged to that cellular subscription; and delivering the stored information from the home/visitor location register to a mobile station associated with the subscriber.

2. The method as in claim 1 wherein the stored information comprises called/calling party identification for each call charged to the cellular subscription.

3. The method as in claim 1 wherein the stored information comprises time of day and duration for each call charged to the cellular subscription.

4. The method as in claim 1 wherein the stored information comprises calling information for each long distance call charged to the cellular subscription.

5. The method as in claim 1 wherein the step of delivering comprises the steps of:

setting up a call connection to the mobile station; and orally transmitting the information supplied by the home/visitor location register over the call connection.

6. The method as in claim 1 wherein the step of delivering comprises the step of sending a data message containing the information over an air interface to the mobile station for display by the mobile station.

7. The method as in claim 6 wherein the data message comprises a short message service (SMS) message.

8. The method as in claim 1 wherein the step of delivering comprises the steps of:

waiting for a subscriber-related event to occur; and delivering the information to the mobile station in response to the occurrence of the subscriber-related event.

9. The method as in claim 8 wherein the subscriber-related event comprises a registration with a cellular system made by the mobile station associated with the subscriber.

10. The method as in claim 8 wherein the subscriber-related event comprises an outgoing call made by the subscriber using the mobile station.

11. A cellular telephone system operating to provide a subscriber with information concerning the use of his cellular subscription, comprising:

a home/visitor location register data base for storing a subscriber's cellular subscription and information relating to a plurality of previously made or received calls charged to that cellular subscription;

a switching node connected to the data base and currently providing cellular service to a mobile station associated with the subscriber, the switching node obtaining the stored information from the data base for delivery to the subscriber; and a communications link between the switching node and the mobile station for delivering the stored information from the switching node to the subscriber's mobile station.

12. The system as in claim 11 wherein the stored information comprises called/calling party identification for each call charged to the cellular subscription.

13. The system as in claim 11 wherein the stored information comprises time of day and duration for each call charged to the cellular subscription.

14. The system as in claim 11 wherein the stored information comprises calling information for each long distance call charged to the cellular subscription.

15. The system as in claim 11 further including a base station providing radio frequency communications service to the mobile station, and wherein the communications link comprises a link between the switching node and the base station and an air interface between the base station and the mobile station.

16. The system as in claim 11 wherein the switching node operates responsive to the occurrence of a subscriber-related event to deliver the information over the communications link to the subscriber.

17. The system as in claim 16 wherein the subscriber-related event comprises a registration with a cellular system made by the mobile station associated with the subscriber.

18. The method as in claim 16 wherein the subscriber-related event comprises an outgoing call made by the subscriber using the mobile station.

19. The system as in claim 11 wherein the switching node further includes an announcement machine, and the delivery of the information is made by an oral message generated by the announcement machine from the information and transmitted over a call connection to the mobile station.

20. The system as in claim 11 wherein the delivery of the information is made by a data message transmitted over the communications link for display by the mobile station to the subscriber.

* * * * *